(12) United States Patent
Cloutier et al.

(10) Patent No.: US 8,820,222 B2
(45) Date of Patent: Sep. 2, 2014

(54) COOKING PAN WITH STRAINER

(75) Inventors: Andre Dean Cloutier, Blaine, WA (US);
Debra Lynne Sasken-Duff, Blaine, WA (US)

(73) Assignee: Magellan Group Ltd., Blaine, WA (US)

( * ) Notice: Subject to any disclaimer, the term of this patent is extended or adjusted under 35 U.S.C. 154(b) by 136 days.

(21) Appl. No.: 13/193,355

(22) Filed: Jul. 28, 2011

(65) Prior Publication Data

US 2013/0025469 A1    Jan. 31, 2013

(51) Int. Cl.
*A47J 27/00*    (2006.01)

(52) U.S. Cl.
USPC .................................. 99/352; 99/422; 99/425

(58) Field of Classification Search
USPC ............ 99/422, 425, 495; 210/470, 498, 499; 220/212, 367.1, 369–371, 573.1
See application file for complete search history.

(56) References Cited

U.S. PATENT DOCUMENTS

| 781,081 | A | * | 1/1905 | MacFate | 222/129 |
| D414,981 | S | * | 10/1999 | Roskind et al. | D7/359 |
| D458,798 | S | * | 6/2002 | Kellermann | D7/360 |
| 6,829,984 | B1 | * | 12/2004 | Leibowitz | 99/425 |
| 7,451,897 | B2 | * | 11/2008 | PaPasodero | 222/189.07 |
| 2009/0120965 | A1 | * | 5/2009 | Archer, Jr. | 222/189.07 |
| 2009/0173239 | A1 | * | 7/2009 | Lee | 99/425 |

* cited by examiner

*Primary Examiner* — Henry Yuen
*Assistant Examiner* — Brandon Harvey
(74) *Attorney, Agent, or Firm* — Dwayne E. Rogge; Schacht Law Office, Inc.

(57) ABSTRACT

Described herein is a cooking assembly, generally comprising two major components, these components being a cooking pan and an insert 24 having a perforated portion which would retain the desired food component within the pan, and allow the fluid component to be removed through the perforations.

10 Claims, 6 Drawing Sheets

COOKING PAN WITH STRAINER

BACKGROUND OF THE DISCLOSURE a) Field of the Disclosure

This disclosure relates to the field of cooking pans having strainers to separate solid from liquid components.

SUMMARY OF THE DISCLOSURE

Disclosed herein is a cooking assembly in several embodiments, one embodiment having a cooking pan having a radially extending handle, and a concave region into which food is to be placed for cooking. The cooking pan having a vertically upward and radially outward rim comprising a pouring region radially offset by about 90° from the radially extending handle wherein the axis of offset is a horizontal center of the concave region of the cooking pan. The cooking pan further includes a perforated straining insert coupled to the cooking pan. One novel feature is a substantially horizontal strainer lid attached to the straining insert and configured to hold solid food items within the cooking pan as fluid components are removed by tipping the cooking pan and allowing the fluid component to flow over the rim in the pouring region; wherein the strainer lid does not cover the entire cooking pan, and allows access to food while cooking and while the lid in an operating position. The cooking assembly may be formed wherein the pouring region comprises a radially outward detented directing spout comprising a small portion of the rim of the cooking pan. The detented directing spout further comprises a radially outward detented pouring spout circumferentially smaller than the detented directing spout.

The cooking assembly may further comprise a helper handle radially opposite the radially extending handle wherein the axis of offset is a horizontal center of the concave region of the cooking pan.

In one form, the portion of the straining insert which is adjacent to the cooking pan is sealed to the cooking pan to prohibit passage of fluid through the gap therebetween.

While many different materials can be used, the cooking assembly as may be formed wherein the cooking pan, and the straining insert are metal. As such, the straining insert may be welded to the cooking pan.

The strainer lid may be flat, concave, or slightly domed (convex). In one form the strainer lid is not perforated, in other forms it may be perforated, or made of mesh material. The strainer and strainer lid pan may be cast as a unitary structure, or may be formed separately. In addition, the strainer and cooking pan may be cast as a unitary structure. In one alternative embodiment, the strainer lid is formed as a unitary structure with the strainer insert.

DESCRIPTION OF THE PREFERRED EMBODIMENTS

Figure 2:
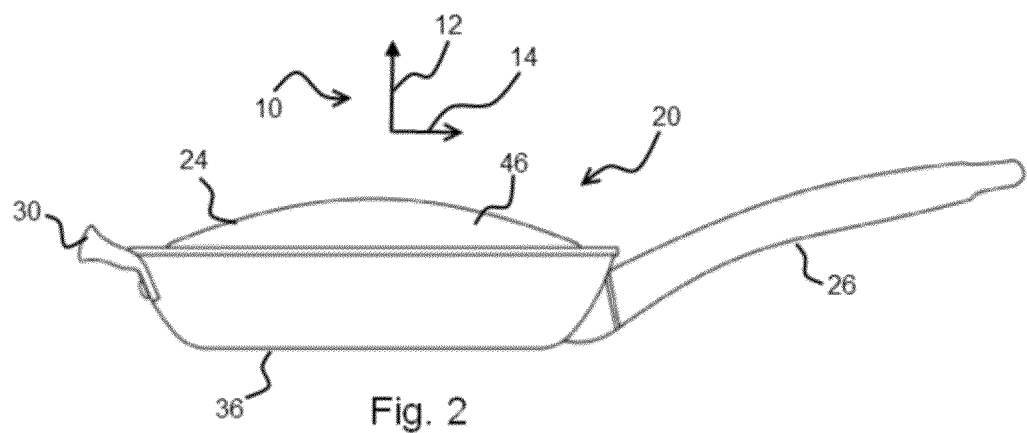
FIG. 2 is a right side view thereof.
Figure 3:
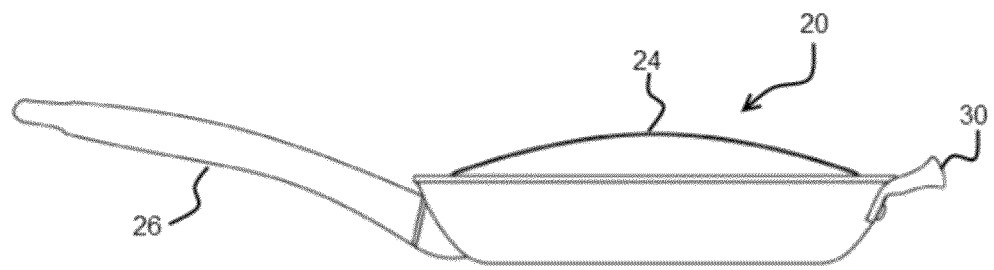
FIG. 3 is a left side view thereof.
Figure 6:
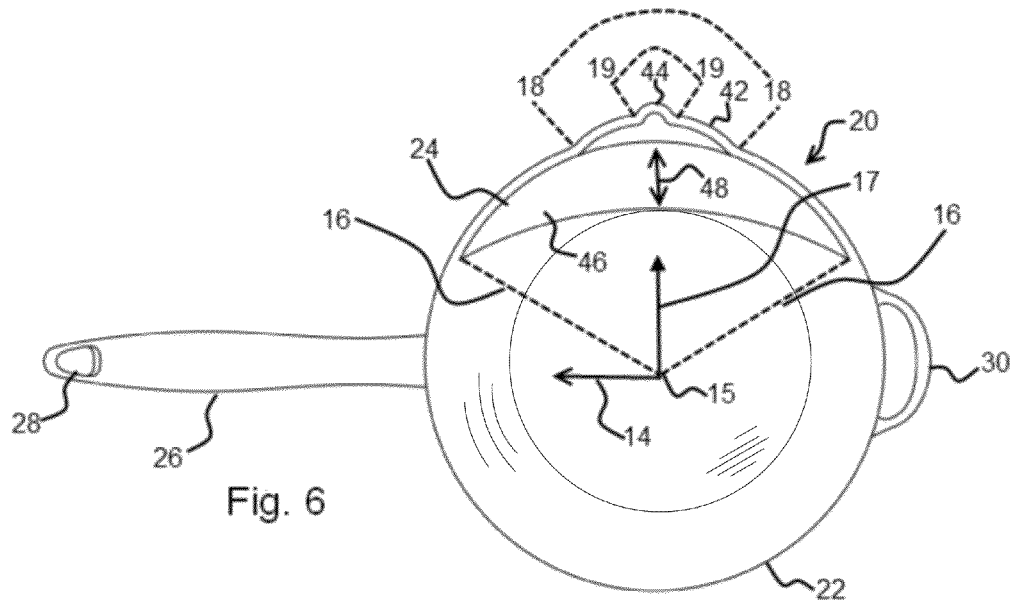
FIG. 6 is a top view thereof.
Figure 7:
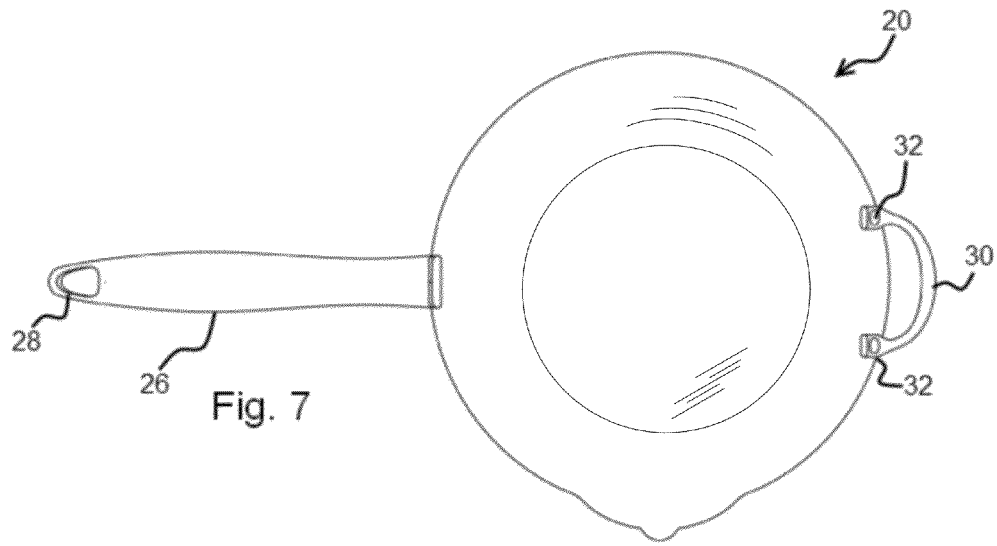
FIG. 7 is a bottom view thereof.

Before beginning a detailed description, an axes system 10 is described. In FIG. 2, the axes 10 are shown with a vertical axis 12 generally pointing in a vertically upward direction, and a radially outward (horizontal) axis 14. In FIG. 2, the radially outward axis 14 points towards the handle although it can be appreciated looking to FIG. 6, that the radially outward axis 14 centers upon the horizontal center 15 of the pan and points radially outward therefrom in any direction. Also shown in FIG. 6 is a pouring region 16 defined by two dashed lines on either side of an arrow 17. The arrow 17 represents a pouring direction, which will be defined in more detail. Additionally, dashed regions 18 and 19 generally represent a directing region 18 and a spout region 19 which will also be described in more detail later. Each of these axes and regions described above are intended to aid in understanding of the invention and are not intended to be limiting.

In general, when cooking it is often desired to remove at least a portion of fluid from the food to be cooked. While this occurs in the process of stir frying of vegetables, potatoes, pasta, fish and other meets etc., a common need for such fluid removal occurs in the cooking of ground meat such as for example hamburger and ground sausage which may generate a substantial amount of fluid as the fat component is heated and liquefies. As it is normally not desired to have this liquid (fat) component in the final consumed product, it is normally strained or blotted off to leave the meat component for consumption. Often the liquefied fluid (fat) component is discarded or may be saved for other uses.

Described herein is a cooking assembly 20, generally comprising two major components, these components being the cooking pan 22 and an insert 24 having a perforated portion which would retain the desired food component within the pan 22, and allow the fluid component to be removed. For ease of use, the assembly 22 may further comprise a cooking or grasping the handle 26 which extends radially outward from the pan 22. In one form, the cooking handle 26 comprises a hanging eye 28 used to hang the assembly 20 for display, sales, or storage. In one form, a helper handle 30 is provided, radially opposite the cooking handle 26, to further assist the user while pouring off the non-desired food component. As shown, the helper handle 30 is attached to the body of the pan 22 by way of a plurality of rivets 32 although other fastening means such as screws, bolts, or welds could alternatively be used.

As with most cooking pans, the pan 22 comprises a concave inner surface 34 into which food is placed for cooking. In one form as can be understood by looking to Fig. The bottom surface 36 is normally placed on a heating surface upon which the pan 22 is heated especially the lower portion 36 and the cooked food within the concave portion 34 is cooked. Either at the end of the cooking process, or as an intermediate step, the cooking assembly 20 is lifted from the heating surface and repositioned towards some sort of receiver for the fluid portion. The user then may additionally grasp the helper handle 30 providing a pivoting axis generally along the length of the cooking handle 26 and extending toward the helper handle 30. The cooking assembly 20 is then pivoted (tilted) so that the pouring region 16 is generally downward and the food they reposition toward the insert 24 and the fluid component would pass through the perforations 38 and over the lip 40 of the pan 22 into the fluid receiver.

Figure 1:
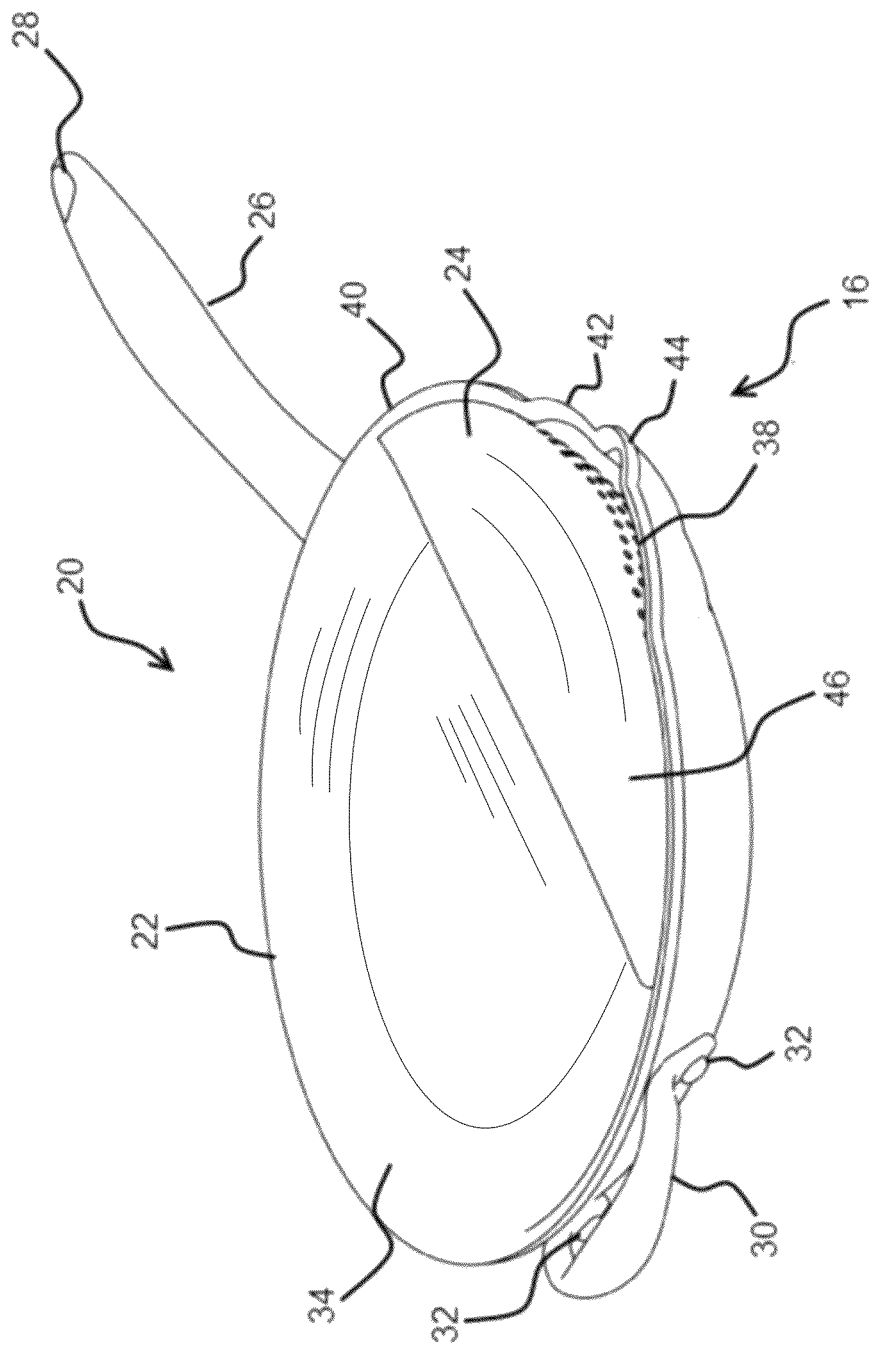
FIG. 1 is a perspective view of the cooking pan with strainer insert.
Figure 4:
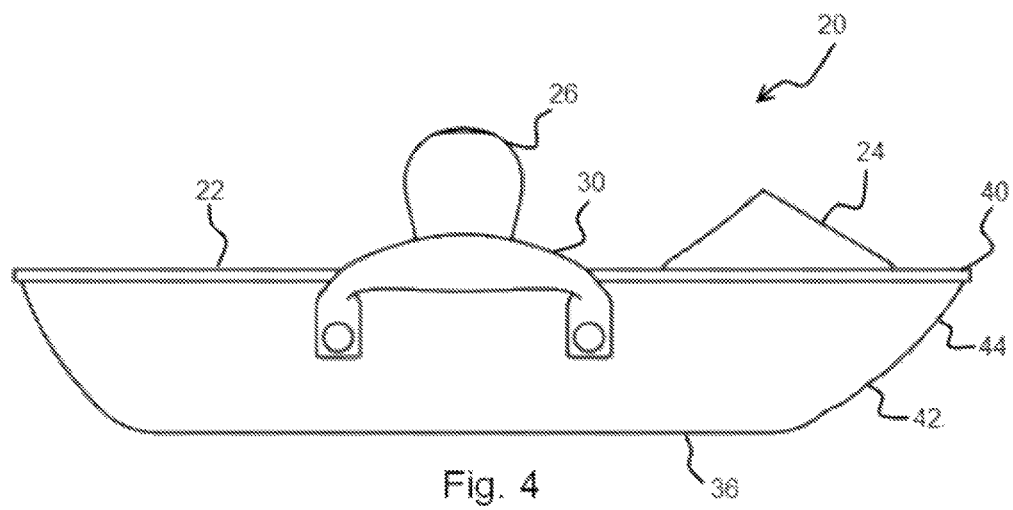
FIG. 4 is a front view thereof.
Figure 5:
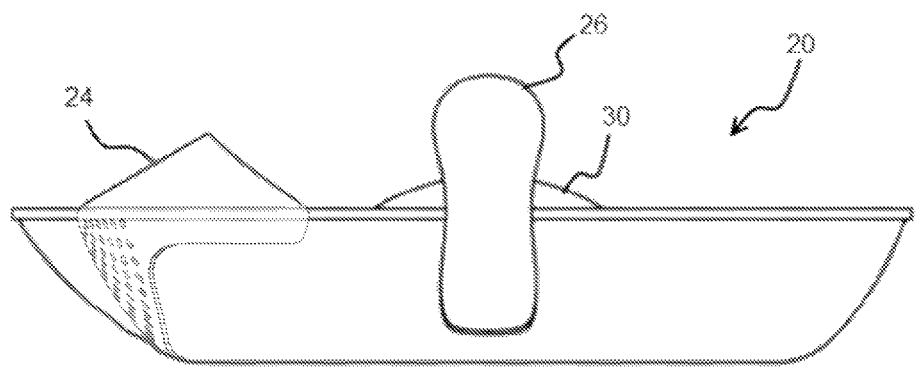
FIG. 5 is a rear view thereof.

In one form, the pouring region 16 further comprises a radially outward detented directing spout 42 shown in FIG. 1 but more usually seen in FIG. 6. This portion can also be seen in FIG. 8 as well as FIG. 4 where it can be seen that the directing spout 42 extends downward toward the bottom surface 36 of the pan 22. It can also be seen in FIG. 4 that in this embodiment, the lip 49 neither goes vertically upward nor downward at the directing spout 42. The directing spout 42, as with any spout, assists the user in pouring out the fluid component without spilling or dripping beyond the fluid receiver. In one form, a radially outward detented pouring spout 44 is added to the directing spout 42 to further assist the user in pouring out the fluid component without spilling or dripping beyond the fluid receiver. Again, the pouring spout 44 can be seen in FIG. 1 but more easily seen in FIG. 6 where the pouring spout 44 is defined by the spout region 19 and the directing spout 42 is defined by the directing region 18 previously described. Again, by looking to FIG. 4 it can be seen that the pouring spout 44 extends downward toward the bottom surface 36 of the pan 22.

To keep the food from traveling over the upper region (lip) of the insert 24, a strainer lid 46 is provided which may or may not be perforated. Thus as the cooking assembly 20 is tipped to pour off the fluid component, the food component is retained in part by the concave surface 34 of the pan 22 in coordination with the perforated portion of the insert 24, and the strainer lid 46. This coordination allows the user to hold the assembly 20 in a pouring orientation for extended period of time without fear that the fluid component will be ejected as commonly occurs when a kitchen implement such as fork, spoon, knife, or standard cooking lid held against the edge of the pan and used as a strainer. One particular advantage of the arrangement of the lid 46 in this disclosure is that access to the concave portion 34 of the pan 22 is not substantially hindered during cooking as the lid 46 does not cover a substantial horizontal portion of the pan 22. This can be very easily seen in FIG. 6 where in the widest radial dimension 48 of the lid 46 is not a substantial portion of the overall pan 22 but rather provides just enough coverage to hold a normal amount of food there in during separation or pouring.

Figure 8:
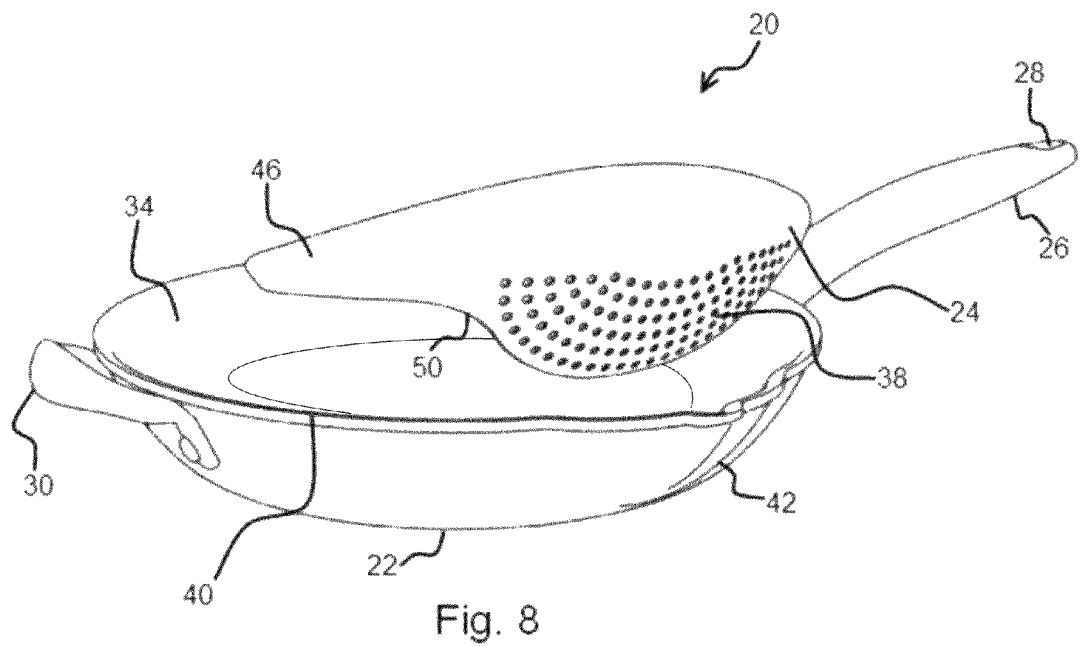
FIG. 8 is a perspective view thereof with the strainer insert not attached to the cooking pan.
Figure 9:
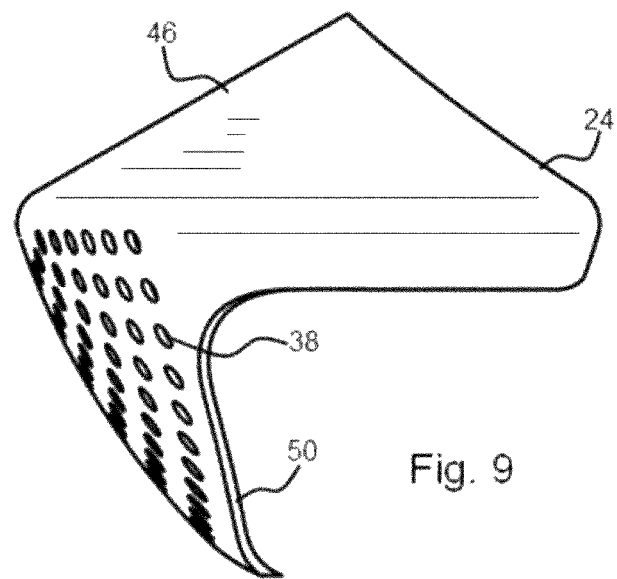
FIG. 9 is a right view of the strainer insert with the left view being a mirror image thereof.
Figure 10:
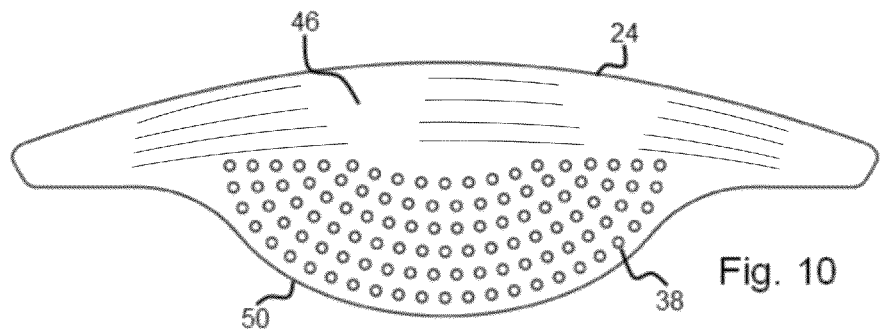
FIG. 10 is a front view of the strainer insert thereof.
Figure 11:
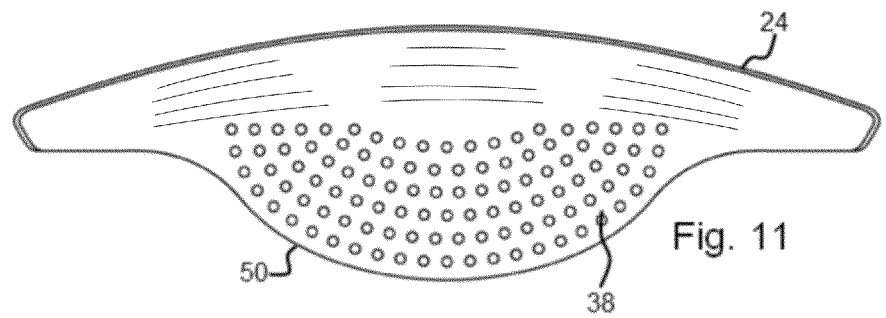
FIG. 11 is a rear view of the strainer insert thereof.
Figure 12:
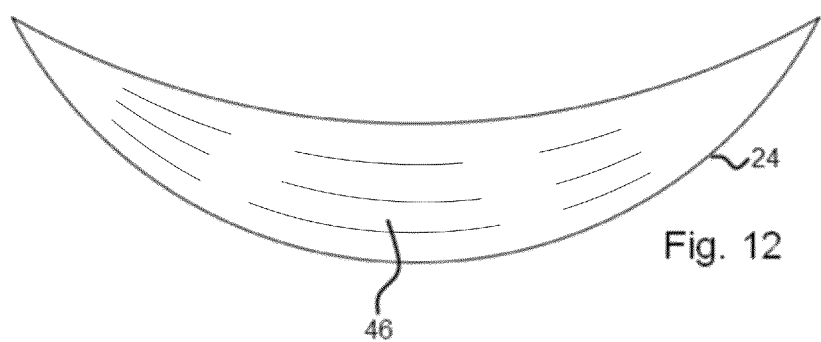
FIG. 12 is a top view of the strainer insert thereof.
Figure 13:
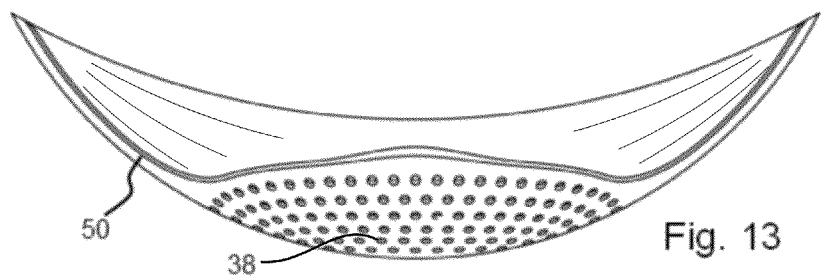
FIG. 13 is a bottom view of the strainer insert thereof.

Looking to FIGS. 8-13, the insert 24 can be more readily seen as it is separated from the pan 22. In FIGS. 8 and 10, one pattern of perforations 38 can be seen as well as the lower edge 50 which is adjacent to the inner surface 34 of the pan 22 when the insert is in the operating position. Of course other patterns of perforations, mesh, and other variations would be equivalent. It may even be desired to continue the perforations higher toward the lid, or to vary the hole sized for particular uses. Looking to FIGS. 9 and 2, it can be seen how the strainer lid 46 in this form is domed upward to add rigidity, aesthetic value, and additional space within the holding region of the strainer. In one form, the strainer 24 including the lid 46 is formed (cast or pressed) as a unitary homogenous structure. In another form, the strainer 24 is formed as a unitary structure with the cooking pan 22. It is also conceived to form the cooking pan 22 with the strainer 24 including the lid 46 as a unitary homogenous structure.

While the cooking pan 22 and strainer insert 24 may be made of many different heat resistant materials, it is proposed that aluminum, and stainless steel may be of particular benefit for their rigidity, ease of cleaning, and cost. It may additionally be preferable to produce the pan out of one material, and the insert out of another material, as the insert may be exposed to somewhat lower temperatures where it is not in direct contact with the heating surface. Some plastics and equivalents may work well for the insert, and some ceramics, such as glass, may work well for the pan.

It may also be desired to coat the inner surface of the pan 22 and strainer 24 with a non-stick thermal resistant coating, such as polytetrafluoroethylene (PTFE) for example, or equivalents.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A cooking assembly comprising:
   a. a cooking pan having a radially extending handle;
   b. the cooking pan having a concave region with a substantially planar bottom into which food is to be placed for cooking;
   c. the cooking pan having a vertically upward and radially outward rim comprising a pouring region radially offset by about 90° from the radially extending handle wherein the axis of offset is a horizontal center of the concave region of the cooking pan;
   d. a strainer permanently fixed to the cooking pan;
   wherein the pouring region comprises a radially outward detented directing spout comprising a small portion of the rim of the cooking pan;
   wherein the detented directing spout further comprises a radially outward detented pouring spout circumferentially smaller than the detented directing spout;
   wherein the strainer comprises a perforated region adjacent the directing spout, radially inward therefrom, and substantially extending from the planar bottom of the cooking pan to the rim;
   e. the strainer forming a substantially horizontal strainer lid configured to hold solid food items within the cooking pan as fluid components are removed by tipping the cooking pan and allowing the fluid component to flow over the rim in the pouring region;
   f. wherein the strainer and strainer lid are a unitary structure; and
   g. wherein the strainer lid does not cover the entire cooking pan, and allows access to food while cooking and while the lid is in an operating position.

2. The cooking assembly as recited in claim 1 further comprising a helper handle radially opposite the radially extending handle wherein the axis of offset is a horizontal center of the concave region of the cooking pan.

3. The cooking assembly as recited in claim 1 wherein the strainer is sealed to the cooking pan to prohibit passage of fluid through the gap therebetween.

4. The cooking assembly as recited in claim 1 wherein the cooking pan, and the straining insert are metal.

5. The cooking assembly as recited in claim 4 wherein the straining insert is welded to the cooking pan.

6. The cooking assembly as recited in claim 1 wherein the strainer lid is slightly domed.

7. The cooking assembly as recited in claim 1 wherein the strainer lid is not perforated.

8. The cooking assembly as recited in claim 1 wherein the straining insert and cooking pan are a unitary structure.

9. A cooking assembly comprising:
 a. a cooking pan having a radially extending handle and a helper handle radially opposed to the radially extending handle;
 b. the cooking pan having a concave region forming a cooking surface into which food is to be placed for cooking;
 c. the cooking pan having a vertically upward and radially outward rim comprising a pouring region radially offset by about 90° from the radially extending handle wherein the axis of offset is a horizontal center of the concave region of the cooking pan;
 wherein the pouring region comprises a radially outward detented directing spout comprising a portion of the rim of the cooking pan;
 d. a perforated strainer having an arcuate radially outward surface;
 wherein the strainer comprises a perforated region adjacent the directing spout, radially inward therefrom, and substantially extending from the planar bottom of the cooking pan to the rim;
 e. the perforated strainer permanently fixed to the cooking pan
 f. the strainer forming a substantially horizontal strainer lid configured to hold solid food items within the cooking pan as fluid components are removed by tipping the cooking pan and allowing the fluid component to flow over the rim in the pouring region;
 g. wherein the strainer and strainer lid are a unitary structure; and
 h. wherein the strainer lid does not cover the entire cooking pan, and allows access to food while cooking and while the lid is in an operating position.

10. The cooking assembly as recited in claim 9 wherein the perforated straining insert is sealed to the cooking pan to prohibit passage of fluid through the gap therebetween.

\* \* \* \* \*